United States Patent
Yao et al.

(10) Patent No.: US 10,086,811 B2
(45) Date of Patent: Oct. 2, 2018

(54) BRAKE SYSTEM AND METHOD OF CONTROL

(71) Applicant: ArvinMeritor Technology, LLC, Troy, MI (US)

(72) Inventors: Yixin Yao, Ann Arbor, MI (US); Jonathan L. Honig, Bloomfield, MI (US); John Ashley Peterson, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 565 days.

(21) Appl. No.: 14/187,412

(22) Filed: Feb. 24, 2014

(65) Prior Publication Data

US 2014/0324316 A1  Oct. 30, 2014

Related U.S. Application Data

(60) Provisional application No. 61/817,601, filed on Apr. 30, 2013.

(51) Int. Cl.
| | |
|---|---|
| G05D 1/00 | (2006.01) |
| G06F 7/00 | (2006.01) |
| G06F 17/00 | (2006.01) |
| B60T 8/176 | (2006.01) |
| B60T 8/175 | (2006.01) |
| B60T 8/17 | (2006.01) |
| B60T 8/1761 | (2006.01) |
| B60T 13/58 | (2006.01) |
| B60T 8/32 | (2006.01) |

(52) U.S. Cl.
CPC .............. B60T 8/176 (2013.01); B60T 8/175 (2013.01); B60T 8/1708 (2013.01); B60T 8/17616 (2013.01); B60T 13/585 (2013.01); *B60T 8/3215* (2013.01); *B60T 2270/604* (2013.01)

(58) Field of Classification Search
CPC ........ B60T 8/175; B60T 8/176; B60T 8/1708; B60T 13/585; B60T 8/17616
USPC ......................................................... 701/78
See application file for complete search history.

(56) References Cited

U.S. PATENT DOCUMENTS

| | | | |
|---|---|---|---|
| 5,130,928 A | 7/1992 | Petersen | |
| 5,496,098 A * | 3/1996 | Brearley | ................... B60T 1/08 303/22.2 |
| 8,055,422 B2 | 11/2011 | Yurgil | |
| 8,465,107 B2 | 6/2013 | Lloyd | |
| 2009/0145673 A1 | 6/2009 | Soliman et al. | |
| 2011/0130937 A1 | 6/2011 | Krueger et al. | |
| 2011/0276245 A1 | 11/2011 | Krueger et al. | |
| 2011/0282558 A1 | 11/2011 | Park | |

FOREIGN PATENT DOCUMENTS

EP         2570314 A1 *  9/2011

\* cited by examiner

*Primary Examiner* — Maceeh Anwari
(74) *Attorney, Agent, or Firm* — Brooks Kushman P.C.

(57) ABSTRACT

A vehicle brake system and a method of control. A friction brake torque and a secondary brake torque may be applied with a friction and secondary brakes, respectively, under various operating conditions, such as when a brake torque command is less than a threshold brake torque command.

20 Claims, 2 Drawing Sheets

BRAKE SYSTEM AND METHOD OF CONTROL

CROSS-REFERENCE TO RELATED APPLICATIONS

This application claims the benefit of U.S. provisional application No. 61/817,601, filed Apr. 30, 2013, the disclosure of which is incorporated in its entirety by reference herein.

TECHNICAL FIELD

This patent application relates to a brake system that may be provided with a vehicle and a method of control.

BACKGROUND

An air braking system for a vehicle that blends regenerative and foundation braking is disclosed in U.S. Pat. No. 8,465,107.

SUMMARY

In at least one embodiment, a vehicle brake system is provided. The vehicle brake system may include a friction brake, a secondary brake, and a controller. The friction brake may be disposed proximate a vehicle wheel and may be configured to provide a friction brake torque to slow rotation of the vehicle wheel. The secondary brake may be configured to provide a secondary brake torque that slows rotation of the vehicle wheel by decreasing torque that may be provided to the vehicle wheel to rotate the vehicle wheel. The controller may control the friction brake and the secondary brake such that the friction brake torque and the secondary brake torque may be applied when a brake torque command is less than a threshold brake torque command.

In at least one embodiment, a method of controlling a brake system may be provided. The method may execute a brake blending control strategy to provide a friction brake torque with a friction brake and a secondary brake torque with a secondary brake when a brake torque command is less than a threshold brake torque command.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
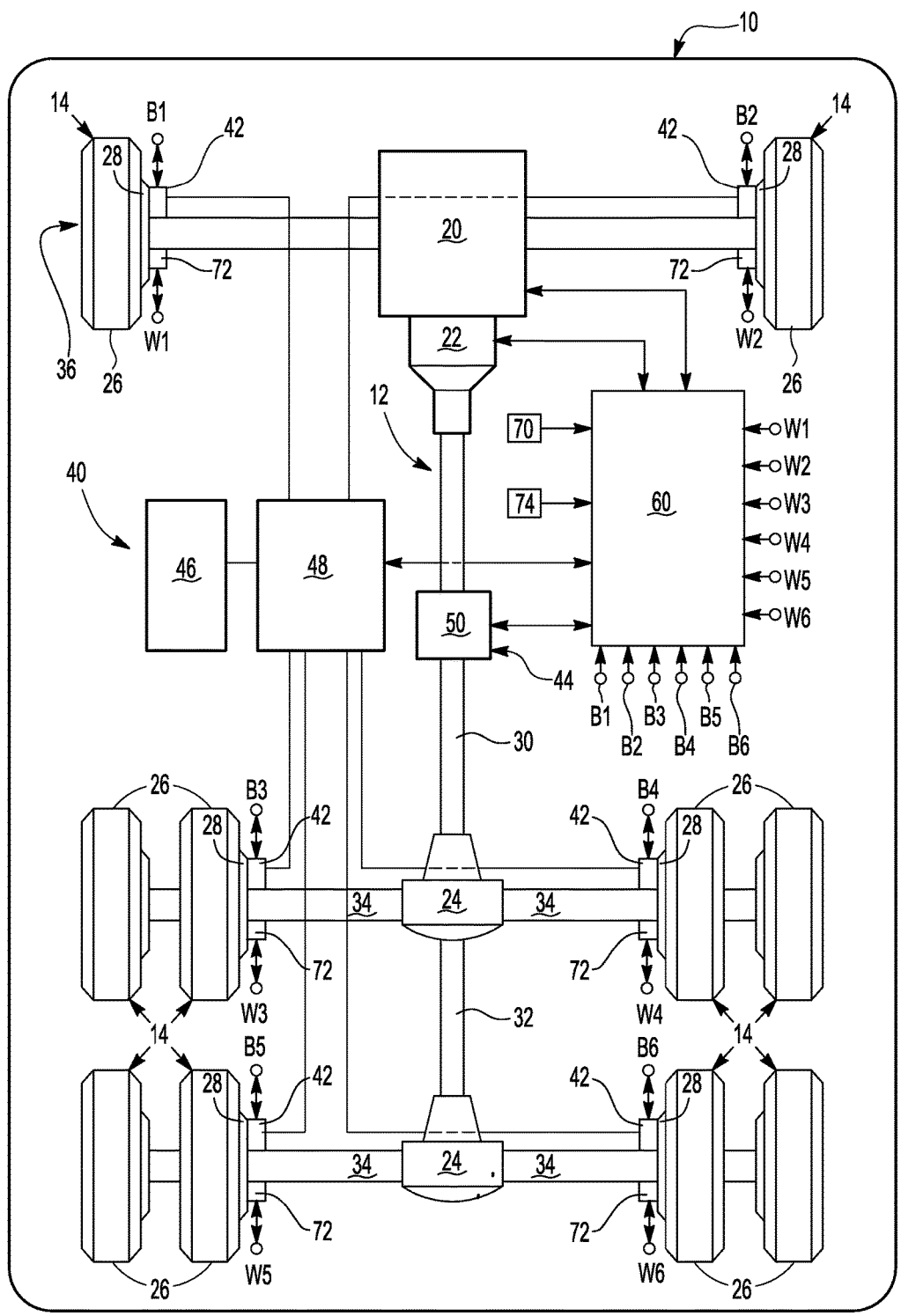
FIG. 1 is a schematic of an exemplary vehicle having a brake system.

Referring to FIG. 1, an exemplary vehicle 10 is shown. The vehicle 10 may be a motor vehicle like a truck, farm equipment, or military transport or weaponry vehicle. The vehicle 10 may include a trailer for transporting cargo in one or more embodiments.

The vehicle 10 may have a drivetrain 12 that may provide torque to one or more wheel assemblies 14 to propel the vehicle 10. The drivetrain 12 may have a hybrid configuration that may employ multiple power sources or a non-hybrid configuration. In a non-hybrid configuration, the drivetrain 12 may include an engine 20, a transmission 22, and at least one drive axle assembly 24.

The engine 20 may provide power or a propulsion torque that may be used to rotate one or more wheel assemblies 14 to propel the vehicle 10. For example, the vehicle 10 may have a set of wheel assemblies 14 that may include a tire 26 mounted on a wheel 28. In at least one embodiment, the engine 20 may be configured as an internal combustion engine that may be adapted to combust any suitable type of fuel, such as gasoline, diesel fuel, or hydrogen.

The transmission 22 may be coupled to or may be driven by the engine 20. The transmission 22 may be of any suitable type, such as a multi-gear "step ratio" transmission as is known by those skilled in the art. As used herein, the term transmission may also encompass or include a transfer case that may provide multi-wheel drive or all-wheel drive capability. For simplicity, a separate transfer case is not shown in FIG. 1.

A drive axle assembly 24 may rotatably support one or more wheel assemblies 14. In FIG. 1, two drive axle assemblies 24 are shown in a tandem axle configuration, although it is contemplated that a greater or lesser number of drive axle assemblies 24 may be provided. In a tandem configuration, the drive axle assemblies 24 may be designated as a forward-rear drive axle assembly and a rear-rear drive axle assembly. An output of the transmission 22 may be connected to an input of the forward-rear axle assembly 24 with a drive shaft 30. An output of the forward-rear drive axle assembly 24 may be selectively or continuously coupled to an input of the rear-rear drive axle assembly 24, if provided, via a prop shaft 32. Each drive axle assembly 24 may each have at least one output or output shaft that may be coupled to a wheel assembly 14. For example, each drive axle assembly 24 may be coupled to a corresponding wheel axle 34 or half-shaft upon which one or more wheel assemblies 14 may be disposed.

The vehicle 10 may also include a front axle assembly 36 that may be configured to steer the vehicle 10. The front axle assembly 36 may or may not be configured as a drive axle that provides torque to at least one associated wheel assembly 14.

Referring to FIG. 1, a brake system 40 may be provided with the vehicle 10. The brake system 40 may include a set of friction brakes 42 or friction braking system and at least one secondary brake 44 or secondary braking system.

A friction brake 42, which may also be called a foundation brake, may be configured to slow or inhibit rotation of at least one associated wheel assembly 14. Each friction brake 42 may be disposed proximate a wheel assembly 14 and may include at least one brake pad assembly and a brake friction member. A brake pad assembly may have a friction material, which may also be called a brake lining, that may engage the brake friction member during vehicle braking and may be spaced apart from the brake friction member when the friction brake 42 is not being applied. More specifically, a brake pad assembly may engage the brake friction member when braking is requested or commanded such that the frictional force exerted by the brake pad assembly against the brake friction member retards or slows rotation of its associated wheel assembly 14. The brake pad assembly may be spaced apart from the brake friction member when braking is not requested or applied. As such, the brake friction member may rotate with a wheel assembly 14 and with respect to a brake pad assembly when braking is not requested.

The friction brake 42 may have any suitable configuration. For example, a friction brake 42 may be configured as a drum brake or a disc brake. In a disc brake configuration, the brake friction member may be configured as a rotor and first and second brake pad assemblies may be configured to engage opposite sides of the rotor to slow the rotation of a wheel assembly 14. In a drum brake configuration, the brake friction member may be a brake drum that may extend completely around first and second brake pad assemblies that may be configured to engage the brake drum to slow rotation of a wheel assembly 14. The brake drum may be disposed between a wheel assembly 14 and a wheel hub assembly that may rotatably support the wheel assembly 14.

The friction brake 42 may use any suitable actuator or actuation system to actuate a brake pad assembly. For example, a pneumatic, hydraulic, electrical, or electromechanical actuation system may be employed as are known by those skilled in the art. In FIG. 1, the friction brake 42 has a pneumatic configuration that may include a pressurized gas source 46 and a brake blending control unit 48.

The pressurized gas source 46 may be configured to supply and/or store a volume of a pressurized gas or pressurized gas mixture, such as air and/or nitrogen. For example, the pressurized gas source 46 may include a tank and/or a pump like a compressor that may be driven by the engine 20 or a vehicle power source. The pressurized gas source 46 may be disposed on the vehicle 10 and may be configured to provide a pressurized gas or pressurized gas mixture at a pressure that is sufficient to actuate one or more friction brakes 42. The pressurized gas source 46 may also provide pressurized gas to other vehicle components. For example, the pressurized gas source 46 may provide pressurized gas to a tire inflation system at a pressure that is greater than or equal to a target inflation pressure of a tire 26.

The brake blending control unit 48 may be fluidly connected to the pressurized gas source 46. The brake blending control unit 48, which may also be called a brake pneumatic unit (BPU) when a pneumatic friction brake actuation system is employed, may control operation of the friction brakes 42 by controlling actuation of a brake pad assembly or engagement and disengagement of a brake pad assembly with the brake friction member. For example, the brake blending control unit 48 may include one or more valves that may control the flow of pressurized gas from the pressurized gas source 46 to and/or from the friction brakes 42 to advance and retract the associated brake pad assemblies.

The secondary brake 44, which may also be called an auxiliary braking device, may be separate from the friction brake 42. The secondary brake 44 may be associated with the drivetrain 12 and may provide a secondary brake torque that may slow the rotation of a wheel assembly 14 and may decrease the propulsion torque provided by the drivetrain 12 or the torque that is provided to rotate the wheel assembly 14 and propel the vehicle 10. The secondary brake 44 may not include a brake pad assembly and a brake friction member. In addition, the secondary brake 44 may not be disposed proximate a wheel assembly 14 in some configurations.

The secondary brake 44 may be provided in various configurations. For example, the secondary brake 44 may be configured as a driveline retarder 50 that may be provided with a drivetrain component, such as the transmission 22, the drive shaft 30, or a wheel axle 34. The driveline retarder 50 may utilize electromagnetic induction or magnetic force to inhibit rotation of driveline components with respect to another. For instance, the driveline retarder 50 may allow different shaft segments of the drive shaft 30 to rotate at different speeds to achieve retardation. A driveline retarder 50 may also have a hydraulic configuration. In a hydraulic configuration, a hydraulic fluid may exert viscous drag forces between dynamic and static vanes in a fluid-filled chamber to achieve retardation. The driveline retarder 50 may be referred to as a transmission retarder when provided with the transmission 22. In addition, the secondary brake 44 may be configured as an exhaust brake, an engine compression brake, or a regenerative braking system in one or more embodiments. An exhaust brake may inhibit exhaust gas from exiting the engine 20 to reduce the engine speed and the amount of propulsion torque provided by the engine 20. An engine compression brake may open cylinder exhaust valves of the engine 20 to reduce torque output. A regenerative braking system may capture vehicle kinetic energy during braking to slow the vehicle 10. It is also contemplated that the secondary brake 44 may include multiple secondary brake configurations. For instance, the secondary brake 44 may include a driveline retarder, an exhaust brake, an engine compression brake, and/or a regenerative braking system in combinations of two or more.

A secondary brake 44 may be applied independently of the friction brake 42 or in conjunction with the friction brake 42. As such, the secondary brake 44 may provide additional braking capability as compared to a friction brake 42 or set of friction brakes alone. The secondary brake 44 may also help reduce wear and maintenance of friction brake components by reducing friction braking and may help reduce friction brake fade in which a reduction in vehicle stopping power may occur due to elevated friction brake temperatures after repeated or sustained application of the friction brake 42.

One or more control modules or controllers 60 may be provided to monitor and control various components and systems of the vehicle 10. For example, the controller 60 may be electrically connected to or communicate with components of the drivetrain 12, such as the engine 20 and transmission 22, to monitor and control their operation and performance. The controller 60 may also monitor and control the brake system 40. For example, the controller 60 may monitor and control the amount of brake torque provided by the friction brakes 42 and the secondary brake 44 and may control operation of the brake blending control unit 48 as will be discussed in more detail below. As such, the controller 60 may cooperate with the brake system 40 provide antilock braking or antilock brake system (ABS) functionality, traction control functionality, and/or electronic stability control (ESC) functionality. For simplicity, a single controller is shown in FIG. 1; however, it is contemplated that multiple control modules or controllers or a distributed control architecture may be provided with the vehicle 10. For instance, with respect to the brake system 40 separate controllers may be provided to control the set of friction brakes 42 and the secondary brake 44. Communication between the controller 60 and each friction brake 42 or sensors associated with a friction brake 42 is represented by connection nodes B1 through B6 in FIG. 1. In addition, the controller 60 may also process input signals or data from various input devices or sensors. Input devices that may be provided with the vehicle 10 may include a brake pedal sensor 70, a wheel speed sensor 72, and a vehicle speed sensor 74.

A brake pedal sensor 70 may be provided to detect a braking command or a brake torque command that may be provided by a vehicle driver or vehicle operator. For example, the brake pedal sensor 70 may detect the position of a brake pedal or the position or operating state of a component that may be connected to or operated by a brake pedal, such as a treadle valve that may modulate a control fluid pressure that may be provided to a relay valve that may control the supply of fluid to one or more friction brakes 42 or friction brake actuators. Alternatively, the brake pedal sensor 70 may be configured as a pressure sensor that may detect fluid pressure that may directly or indirectly control a brake actuator or braking of the vehicle 10. The detected position of the brake pedal and/or detected pressure may be used to control the brake torque provided by the brake system 40.

The wheel speed sensor 72 may be provided to detect or provide data indicative of a rotational speed of a wheel assembly 14 or wheel 28. The wheel speed sensor 72 may be of any suitable type and may be configured to detect the rotation speed of a wheel assembly 14 or associated wheel axle 34. Data from the wheel speed sensor 72 may also be used to determine a distance of travel of the vehicle 10. For instance, distance of travel may be based on tire size (e.g., tire diameter) and the rotational distance or number of revolutions detected by the wheel speed sensor 72. In at least one embodiment, a wheel speed sensor 72 may be associated with each wheel assembly 14 or wheel axle 34, such as may be provided with an anti-lock brake (ABS) system, traction control system, and/or electronic stability control (ESC) system. As such, the wheel speed sensor 72 may detect wheel slip or unexpected rotation of a wheel assembly 14 in a manner known by those skilled in the art. Communication between the controller 60 and each wheel speed sensor 72 is represented by connection nodes W1 through W6 in FIG. 1.

A vehicle speed sensor 74 may also be provided to detect or provide data indicative of a speed of the vehicle 10. The vehicle speed sensor 74 may be separate from the wheel speed sensor 72 and may be provided with a drivetrain component, such as the transmission 22 or transaxle, driveshaft 30, or an axle assembly shaft to detect vehicle speed based on the rotation speed of a drivetrain component. The vehicle speed sensor 74 may also be a virtual sensor. For example, the vehicle speed sensor 74 may employ data that may be wirelessly transmitted to the vehicle 10, such as data that may be provided to a navigation system or provided by a global positioning system (GPS) or the like to calculate the speed of the vehicle 10.

Figure 2:
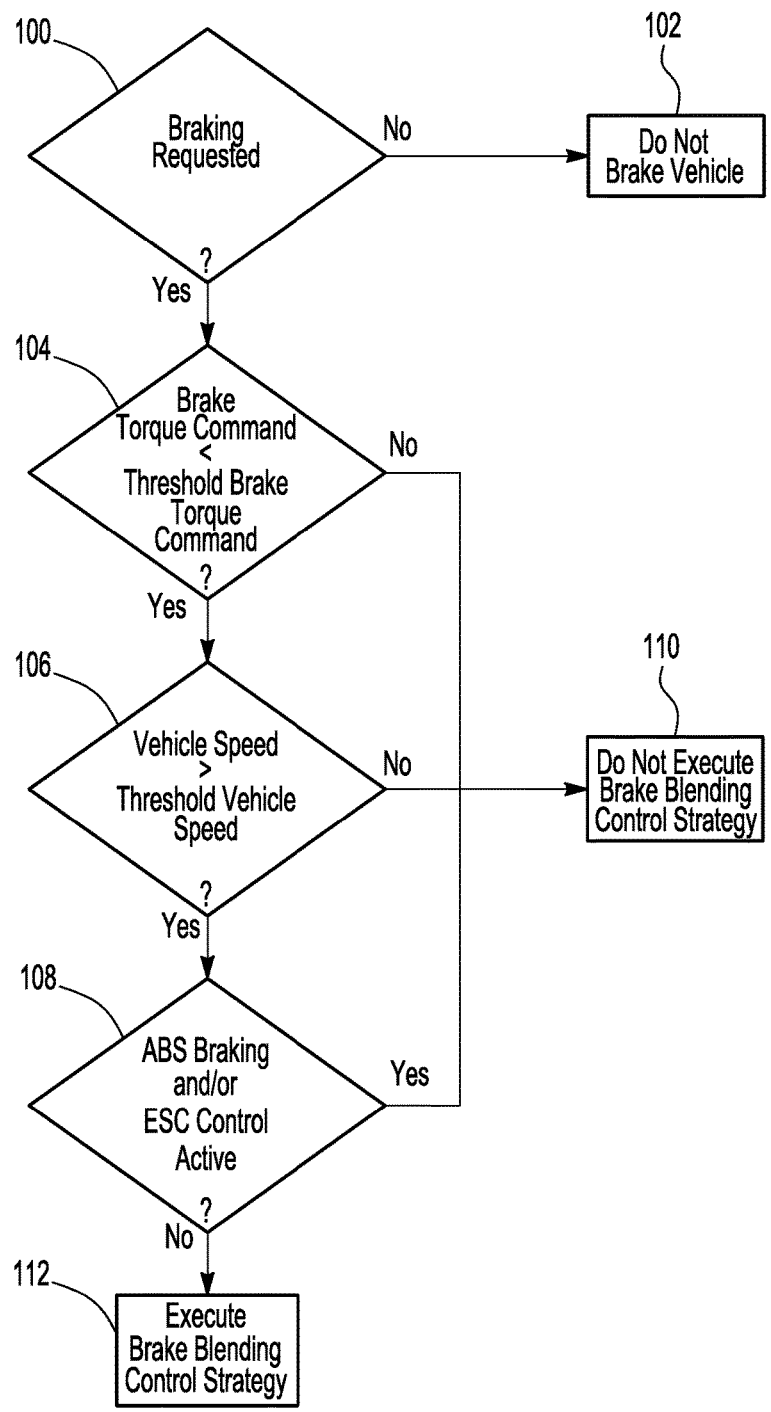
FIG. 2 is a flowchart of a method of controlling a brake system.

Referring to FIG. 2, a flowchart of an exemplary method of controlling a vehicle brake system 40 is shown. As will be appreciated by one of ordinary skill in the art, the flowchart may represent control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multitasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope of the present invention.

In at least one embodiment, a method may be executed by the controller 60 and may be implemented as a closed loop control system or multiple closed loop control systems. For brevity, the method will be described in the context of a single method iteration below. Moreover, the method may be enabled or disabled based the operating state of the vehicle 10 and/or which drivetrain gear ratio is selected. For example, the method may be disabled if a reverse gear ratio is selected or the vehicle 10 not running or a "key-on" condition is not present, which may be based on data from an ignition sensor.

As an overview, the method may control blending of friction brake torque that is associated with operation of the friction brake with a secondary brake torque that is associated with operation of at least one secondary brake. Brake torque blending may be based a request for braking or a driver brake torque demand and may occur when one or more conditions discussed below are not. Brake torque blending may not occur under various operating conditions.

At block 100, the method may determine whether vehicle braking is desired or requested. A request for braking may be based on data or a signal from the brake pedal sensor 70. A request for braking may also be automatically initiated or automatically requested rather than manually requested. For example, braking of the vehicle 10 may be automatically initiated by an adaptive cruise control system or pre-impact collision avoidance system. An adaptive cruise control system may automatically adjust vehicle speed in response to the proximity and/or relative speed of another vehicle. As such, an adaptive cruise control system may brake the vehicle to adjust proximity and/or vehicle speed. A pre-impact collision avoidance system may be configured to detect a potential collision or impact with the vehicle before it occurs and brake or slow the vehicle to avoid a collision. If braking is not initiated or requested, then the method or method iteration may continue at block 102 where the brake system 40 may not be operated to brake or slow the vehicle. If braking is initiated or requested, then the method may continue at block 104.

At block 104, a brake torque command may be compared to a threshold brake torque command. The brake torque command may represent the total amount of vehicle braking or brake torque that is desired or requested. The brake torque command may be based on data or a signal from the brake pedal sensor 70 or a brake torque command signal or data from an adaptive cruise control system or pre-impact collision avoidance system. For example, the magnitude of brake pedal movement or a detected fluid pressure may be used to determine or calculate the amount of braking or brake torque desired. The brake torque command may be compared to the threshold brake torque command. The threshold brake torque command, which may also be referred to as a threshold brake torque command value, may be indicative of a level of brake torque at which or above which braking of the vehicle with the secondary brake 44 is not desired. The threshold brake torque command may represent a high level of brake torque and may be a predetermined value that may be based on vehicle development testing. Moreover, the threshold brake torque command may be tailored to specific vehicle models or vehicle configurations to account for differences in vehicle weight or vehicle attributes and the performance characteristics of the brake system 40. If the brake torque command is less than the threshold brake torque command, then the method may continue at block 106. If the brake torque command is not less than the threshold brake torque command, then the method may continue at block 110.

At block 106, the vehicle speed may be compared to a threshold vehicle speed or threshold vehicle speed value. The vehicle speed may be based on data or a signal from the vehicle speed sensor 74. The threshold vehicle speed may be representative of a vehicle speed under which brake blending or braking of the vehicle with the friction brake 42 and the secondary brake 44 may not be desired. For example, the threshold vehicle speed may a slow rate of speed at which wheel slip and/or friction brake fade is unlikely to occur and/or little wear of friction brake components may be expected. The threshold vehicle speed may be a predetermined value that may be based on vehicle development testing. As one example, the threshold vehicle speed may be about 5 mph (8 kph). If the vehicle speed is greater than the threshold vehicle speed, then the method may continue at block 108. If the vehicle speed is not greater than the threshold vehicle speed, then the method may continue at block 110.

At block 108, the method may determine whether antilock braking (ABS braking) and/or electronic stability control (ESC control) is active. For example, the controller 60 may execute an antilock brake control strategy to rapidly apply and release one or more friction brakes 42 when antilock braking is active. As such, the friction brake may undergo antilock braking when the antilock brake control strategy is activated or executed. Antilock braking may be active when wheel slip is detected. Wheel slip may be indicative of relative motion between a tire 26 and the road surface or surface under the vehicle 10 upon which the tire 26 is moving. A wheel slip condition may be detected during braking the vehicle 10, which may result in activation of antilock braking or an ABS strategy that may rapidly pulse the friction brake 42 to prevent an associated wheel 28 from locking up or ceasing rotation. A wheel slip condition may also be detected while accelerating the vehicle 10, which may result in activation of a traction control strategy that may rapidly pulse the friction brake 42 to prevent an associated wheel 28 from spinning and slipping. An electronic stability control strategy may be activated when wheel slip is detected during either braking or acceleration. Wheel slip may be expressed as a wheel slip ratio that may be representative of a ratio of the rotational speed of a braked wheel to that of an equivalent free rolling wheel. Wheel slip ratio may be expressed as a percentage and may be calculated using the following formula.

Wheel slip ratio %=(Vehicle speed−wheel speed)/ Vehicle speed*100

Wheel speed may be based on data from a wheel speed sensor 72. Vehicle speed may be based on data from the vehicle speed sensor 74.

Wheel slip or the wheel slip ratio may be compared to a slip reference value to determine whether the amount of wheel slip is expected or acceptable. The slip reference value may be a predetermined constant or static value that may be expressed as a percentage of the wheel slip ratio, such as 15% to 20%. A wheel slip condition may exist when the wheel slip ratio exceeds the slip reference value. The antilock brake system (ABS), traction control system, and/or electronic stability control system (ESC) or associated control strategies may be activated to control operation of the brake system 40 when a wheel slip condition is detected. If a wheel slip condition is detected or the antilock brake system (ABS), traction control system, and/or electronic stability control system (ESC) are active and are actively braking the vehicle, then the method may continue at block 110. If a wheel slip condition is not detected or the antilock brake system (ABS), traction control system, and electronic stability control system (ESC) are not active or actively braking the vehicle, then the method may continue at block 112.

At block 110, braking of the vehicle may be enabled or executed without brake blending or execution of a brake blending control strategy. As such, one or more friction brakes 42 may be used to slow the vehicle 10 without assistance from the secondary brake 44. The friction brakes 42 may be operated without assistance from the secondary brake 44 under some or all of the conditions in blocks 104-108. For example, the friction brakes 42 may be operated without these assistance from the secondary brake 44 when a high level of brake torque is desired (via block 104), which may help avoid wheel slip that may occur when the secondary brake 44 is operated under hard friction braking or in addition to a high level of brake torque that is being provided with the friction brakes 42. The friction brakes 42 may be operated without assistance from the secondary brake 44 when a low level of brake torque may be sufficient to slow or stop the vehicle (via block 106) or when negligible benefits may be realized by slowing the vehicle with the secondary brake 44. The friction brakes 42 may be operated without assistance from the secondary brake 44 when antilock braking (ABS braking), traction control, and/or stability control (ESC control) strategies are active (via block 108).

At block 112, the method may enable or execute a brake blending control strategy. Execution of a brake blending control strategy may operate the brake system 40 slow the vehicle 10 by applying one or more friction brakes 42 and the secondary brake 44 simultaneously. The controller 60 may execute the brake blending control strategy to blend the friction brake torque from one or more friction brakes 42 with the secondary brake torque from the secondary brake 44 with the brake blending control unit 48. An example of brake blending hardware that may be controlled in accordance with the method in this application is disclosed in U.S. Pat. No. 8,465,107, which is assigned to the assignee of the present invention and is hereby incorporated by reference in its entirety.

As another example, a brake blending control strategy may determine a total amount of brake torque that is desired. The total amount of brake torque that is desired may be based on the brake torque command. Next, the method may determine the amount of brake torque to provide with the secondary brake 44. In at least one embodiment, the method may favor the secondary brake 44 or attempt to provide as much brake torque with the secondary brake 44 as is available. As such, the amount of brake torque provided with the secondary brake 44 may be the amount of brake torque that is available from the secondary brake 44 or the total or maximum amount of brake torque that the secondary brake 44 may currently provide. The amount of brake torque that is available from the secondary brake 44 may vary due to various factors, such as environmental conditions (e.g., ambient temperature), wheel speed, secondary brake operation attributes (e.g., secondary brake temperature, battery charge/available current/rotational speed of an electric secondary brake, engine back pressure, length of time the secondary brake is active, secondary brake wear, etc.). For example, the available brake torque from a driveline retarder 50 may decrease as its operational temperature increases. The amount of brake torque available from the secondary brake 44 may be calculated or may be referenced, such as with a lookup table that may include data indicative of the available secondary brake torque under various conditions. Next, the amount of brake torque to apply with the friction brake 42 or friction brake torque may be determined, such as by subtracting the available secondary brake torque from the total amount of brake torque desired. The secondary brake torque and friction brake torque may then be simultaneously provided by the secondary and friction brakes, respectively. The secondary brake torque and the friction brake torque that are provided may be dynamic since the brake torque command and/or available secondary brake torque may vary over time as previously discussed.

Brake blending control may also include control of one or more brake actuators or a brake pneumatic unit. For example, a controller may determine, calculate, or receive a signal indicative of a desired pressure or target pressure to provide to a brake. The desired pressure may be compared to an actual pressure (output pressure) to determine a pressure error value. The pressure error value may be zero when the desired pressure is the same as the actual pressure. As such, the controller may not adjust the actual pressure when the pressure error value is zero. The controller may adjust the actual pressure when the pressure error value is not zero or substantially differs from zero. For instance, the actual pressure may be increased when the desired pressure exceeds the actual pressure. Likewise, the actual pressure may be decreased when the desired pressure is less than the actual pressure. Nonlinear compensation may also be employed to compensate for nonlinearity of the actuator or actuator system being controlled.

The system and method described herein may allow a friction brake and a secondary brake to be applied simultaneously to provide additional braking power as compared to providing a friction brake torque or a secondary brake torque alone. Moreover, the system and method may allow the friction brake torque and secondary brake torque to be applied in a manner that may inhibit wheel slip or that may not cause wheel slip, which may reduce ABS events or unintended wheel slip. In addition, the method may provide a tunable vehicle stopping distance and improved or more linear brake feel throughout the range of brake pedal travel.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle brake system comprising:
   a friction brake that is disposed proximate a vehicle wheel and that is configured to provide a friction brake torque to slow rotation of the vehicle wheel;
   a secondary brake that is configured to provide a secondary brake torque that slows rotation of the vehicle wheel by decreasing torque that is provided to rotate the vehicle wheel; and
   a controller that controls the friction brake and the secondary brake such that the friction brake torque and the secondary brake torque are applied when a brake torque command is less than a threshold brake torque command.

2. The vehicle brake system of claim 1 wherein the secondary brake torque is not applied when the brake torque command is not less than the threshold brake torque command.

3. The vehicle brake system of claim 1 wherein the friction brake torque and the secondary brake torque are applied when a vehicle speed exceeds a threshold vehicle speed.

4. The vehicle brake system of claim 3 wherein the secondary brake torque is not applied when the vehicle speed does not exceed the threshold vehicle speed.

5. The vehicle brake system of claim 1 wherein the friction brake torque and the secondary brake torque are applied when antilock braking with the friction brake is not active.

6. The vehicle brake system of claim 5 wherein the secondary brake torque is not applied when antilock braking with the friction brake is active.

7. The vehicle brake system of claim 1 wherein the friction brake torque and the secondary brake torque are applied when a vehicle speed exceeds a threshold vehicle speed and antilock braking with the friction brake is not active.

8. The vehicle brake system of claim 1 wherein the friction brake torque and the secondary brake torque are applied when a wheel slip condition is not detected.

9. The vehicle brake system of claim 8 wherein the secondary brake torque is not applied when the wheel slip condition is detected.

10. The vehicle brake system of claim 1 wherein the secondary brake is a driveline retarder.

11. A method of controlling a brake system comprising:
    executing a brake blending control strategy to provide a friction brake torque with a friction brake and a secondary brake torque with a secondary brake when a brake torque command is less than a threshold brake torque command.

12. The method of claim 11 wherein the secondary brake torque is not provided with the secondary brake when the brake torque command is not less than the threshold brake torque command.

13. The method of claim 11 wherein the brake blending control strategy is executed when a vehicle speed exceeds a threshold vehicle speed.

14. The method of claim 13 wherein the brake blending control strategy is not executed and the secondary brake torque is not provided with the secondary brake when the vehicle speed does not exceed the threshold vehicle speed.

15. The method of claim 11 wherein the brake blending control strategy is executed when an antilock braking with the friction brake is not active.

16. The method of claim 15 wherein the brake blending control strategy is not executed and the secondary brake torque is not provided with the secondary brake when antilock braking with the friction brake is active.

17. The method of claim 11 wherein the brake blending control strategy is executed to simultaneously provide the friction brake torque with the friction brake and the secondary brake torque with the secondary brake when vehicle braking is requested, the brake torque command is less than the threshold brake torque command, a vehicle speed exceeds a threshold vehicle speed, and antilock braking with the friction brake is not active.

18. The method of claim 17 wherein the secondary brake torque is not provided with the secondary brake when the brake torque command is not less than the threshold brake torque command, the vehicle speed does not exceed the threshold vehicle speed, or antilock braking with the friction brake is active.

19. The method of claim 11 wherein the brake blending control strategy determines a total amount of brake torque to provide based on the brake torque command and wherein the secondary brake torque is provided is a total amount of brake torque that is available from the secondary brake.

20. The method of claim 19 wherein the friction brake torque is a difference between the total amount of brake torque and the secondary brake torque.

* * * * *